US008789886B2

(12) United States Patent
Mason et al.

(10) Patent No.: US 8,789,886 B2
(45) Date of Patent: Jul. 29, 2014

(54) CHILD SAFETY SEAT

(75) Inventors: Kyle S. Mason, Reading, PA (US); James M. F. Hutchinson, Mohnton, PA (US)

(73) Assignee: BP Children's Products HK Co., Limited, Kowloon (HK)

( * ) Notice: Subject to any disclaimer, the term of this patent is extended or adjusted under 35 U.S.C. 154(b) by 191 days.

(21) Appl. No.: 13/364,599

(22) Filed: Feb. 2, 2012

(65) Prior Publication Data

US 2012/0200131 A1 Aug. 9, 2012

Related U.S. Application Data

(60) Provisional application No. 61/462,626, filed on Feb. 4, 2011.

(51) Int. Cl.
*B60N 2/28* (2006.01)

(52) U.S. Cl.
USPC ........................................ 297/253; 297/256.1

(58) Field of Classification Search
USPC .................................. 297/253, 256.1, 256.16
See application file for complete search history.

(56) References Cited

U.S. PATENT DOCUMENTS

| 4,679,852 | A | 7/1987 | Anthony et al. |
| 6,193,310 | B1 | 2/2001 | Batalaris et al. |
| 7,044,548 | B2 * | 5/2006 | Mullen et al. ................ 297/253 |
| 7,159,948 | B1 * | 1/2007 | Wolf .......................... 297/463.1 |
| 7,168,762 | B2 * | 1/2007 | Maciejczyk ................. 297/253 |
| 7,278,684 | B2 | 10/2007 | Boyle |
| 7,350,767 | B2 * | 4/2008 | Huang .......................... 254/218 |
| 2008/0238179 | A1 | 10/2008 | Patrizi et al. |
| 2010/0033001 | A1 | 2/2010 | Boyer |

FOREIGN PATENT DOCUMENTS

WO 2010075531 A2 7/2010

* cited by examiner

*Primary Examiner* — Sarah B McPartlin
(74) *Attorney, Agent, or Firm* — David I. Roche; Baker & McKenzie LLP

(57) ABSTRACT

A child safety seat includes a seat shell, an anchor strap portion assembled with the seat shell, and a guide bracket adjustable relative to the seat shell. The anchor strap portion has a distal end connected with a fastener that is operable to attach the seat shell with an anchor structure provided in a vehicle. The guide bracket is adjustable relative to the seat shell between a first position and a second position, wherein the anchor strap portion is routed along the guide bracket placed in the first position to have the distal end positioned at a rear of the seat shell, and the anchor strap portion is routed along the guide bracket placed in the second position to have the distal end positioned at a front of the seat shell.

19 Claims, 10 Drawing Sheets

CHILD SAFETY SEAT

CROSS-REFERENCE TO RELATED APPLICATION

This application claims priority to U.S. Provisional Patent Application No. 61/462,626, which was filed on Feb. 4, 2011.

BACKGROUND OF THE INVENTION

1. Field of the Invention

The present invention relates to child safety seats.

2. Description of the Related Art

Conventionally, an automobile vehicle has seatbelts provided at the front and rear seats. The seatbelt generally includes shoulder and lap straps that may be fastened with an anchor point of the vehicle to restrain and protect the occupant in case of collision or sudden stop of the vehicle. However, the use of the vehicle seatbelt is not adapted for a young child who has a smaller body and may not be able to sustain the pressure applied by the seatbelt. As a result, safety legislations require the use of a child safety seat for seating a young child in a vehicle.

In some approaches, the seatbelt of the vehicle can be used to hold the child safety seat in place. In other approaches, the child safety seat can be provided with an independent restraint system that can attach with an anchor structure of the vehicle to hold the child safety seat in place. Depending on the age of the child, the child safety seat can also be installed in the vehicle in a position facing forward or a position facing rearward. Each of these two positions requires a different procedure for securing the child safety seat, which may be subject to confusion and erroneous manipulation from the caregiver.

Therefore, there is a need for a construction that can facilitate the installation of the child safety seat in the vehicle and address at least the foregoing issues.

SUMMARY

The present application describes a child safety seat that is provided with a restraint system for attaching the child safety seat in a vehicle. The child safety seat includes a seat shell, an anchor strap portion assembled with the seat shell, and a guide bracket adjustable relative to the seat shell. The anchor strap portion has a distal end connected with a fastener that is operable to attach the seat shell with an anchor structure provided in a vehicle. The guide bracket is adjustable relative to the seat shell between a first position and a second position, wherein the anchor strap portion is routed along the guide bracket placed in the first position to have the distal end positioned at a rear of the seat shell, and the anchor strap portion is routed along the guide bracket placed in the second position to have the distal end positioned at a front of the seat shell.

At least one advantage of the structures described herein is the ability to provide a guide bracket that can conveniently adjust the position of the anchor strap portions according to the placement of the child safety seat in the vehicle, i.e., installed in a forward facing or rearward facing position. Accordingly, the installation of the child safety seat in the vehicle can be facilitated, and erroneous manipulation can be prevented.

DETAILED DESCRIPTION OF THE EMBODIMENTS

The present application describes a child safety seat that is provided with a restraint system for attaching the child safety seat in a vehicle. The restraint system is mounted with a seat shell of the child safety seat, and can be conveniently adjusted according to the installation of the child safety seat in either of a forward facing position and a rearward facing position.

Figure 1:
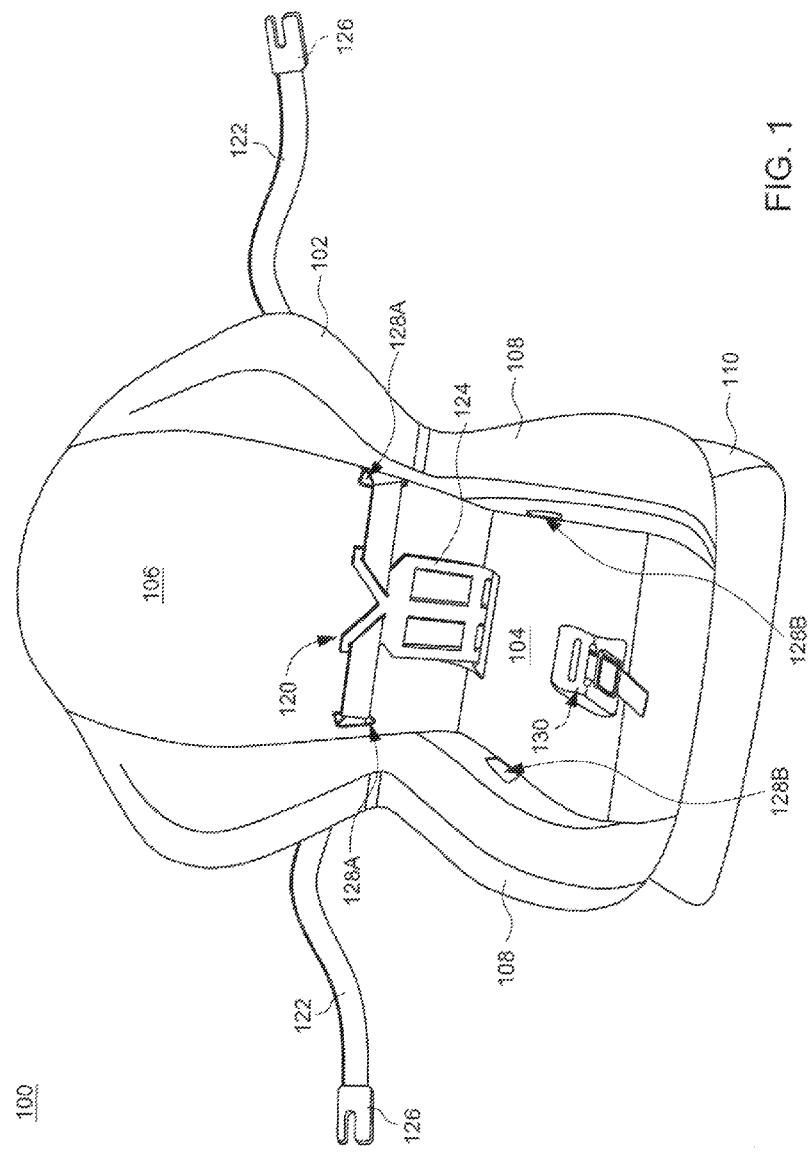
FIG. 1 is a schematic view illustrating an embodiment of a child safety seat provided with a restraint system.
Figure 2:
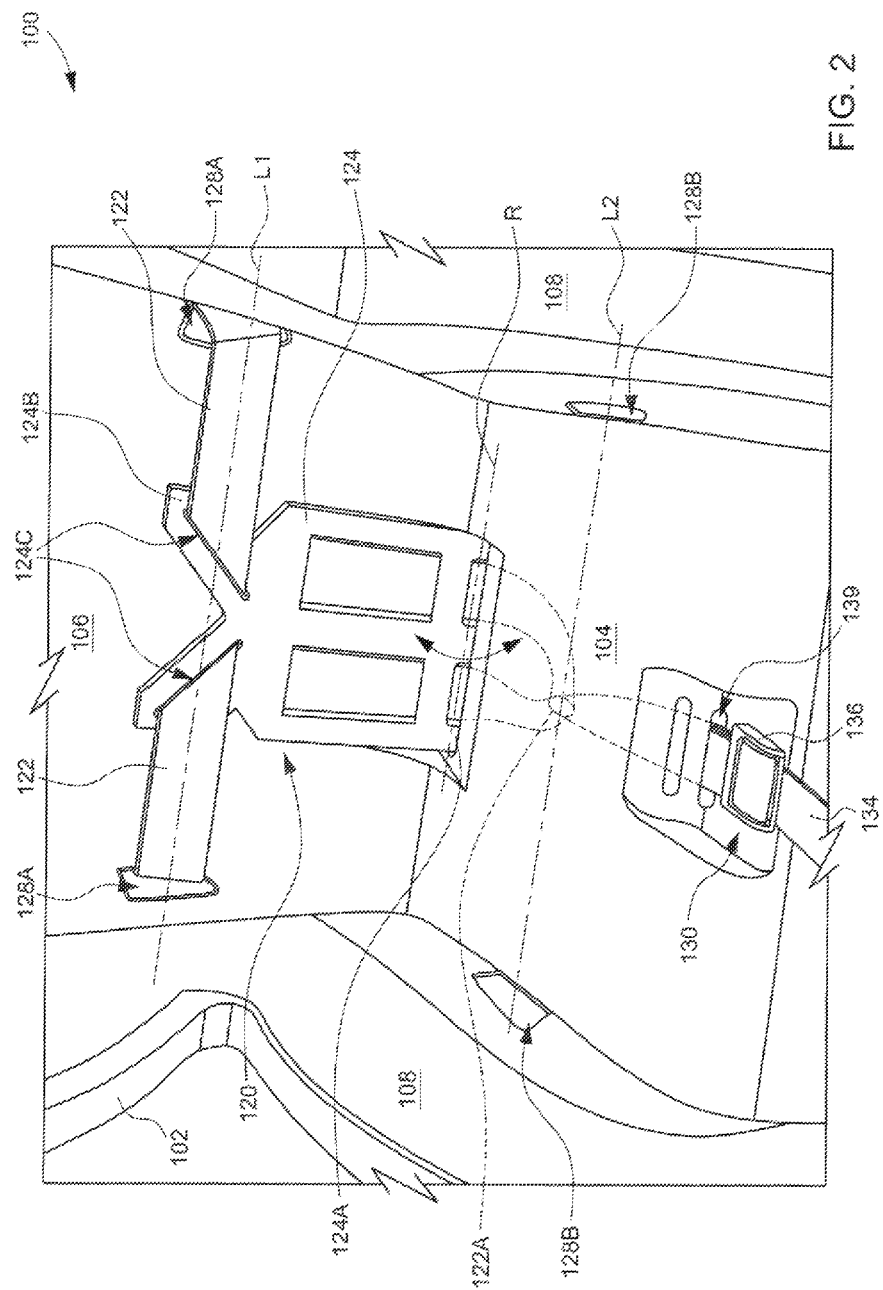
FIG. 2 is a partially enlarged view illustrating the restraint system of the child safety seat.

FIG. 1 is a perspective view illustrating an embodiment of a child safety seat 100 provided with a restraint system 120, and FIG. 2 is a partially enlarged view illustrating the restraint system 120. The child safety seat 100 can have a seat shell 102 formed in a single body by plastic molding. The seat shell 102 can include a seating portion 104, a seatback 106, and lateral guards 108 raised parallel to each other at left and right sides of the seat shell 102.

In some embodiments, the seat shell 102 can also be used in association with a base 110. The base 110 can rest at the bottom of the seating portion 104 to provide stable support. It is noted that the base 110 can be optional, and alternate embodiments may use the child safety seat 100 alone without the base 110.

The lateral guards 108 raised at the left and right sides can extend from the front to the rear of the seat shell 102. The lateral guards 108 can act to provide lateral protection and restrict lateral movements of the child.

Referring again to FIGS. 1 and 2, the child safety seat 100 can also include a restraint system 120 mounted with the seat shell 102. When the child safety seat 100 is installed in a vehicle, the restraint system 120 can attach with an anchor structure provided in a vehicle to hold the seat shell 102 in place. As shown, the restraint system 120 can include two anchor strap portions 122 and a guide bracket 124. In one embodiment, the anchor strap portions 122 can belong to two distinct straps. In alternate embodiments, the anchor strap portions 122 can belong to a same single strap. The anchor strap portions 122 can be assembled with the seat shell 102. Moreover, a distal end of each anchor strap portion 122 can be affixed with a fastener 126 adapted to engage with an anchor structure 144 of a vehicle for attaching the child safety seat 100 with the anchor structure 144 of the vehicle (better shown in FIGS. 6 and 7).

The seat shell 102 can include two pairs of openings 128A and 128B symmetrically distributed at the left and right sides for passage of the anchor strap portions 122 from an interior of the seat shell 102 toward an outside of the seat shell 102. More specifically, the two first openings 128A can be formed through the seat shell 102 for facilitating the passage of the anchor strap portions 122 toward a rear of the seat shell 102, and the two second openings 128B can be formed through the seat shell 102 in front of the openings 128A for facilitating the passage of the anchor strap portions 122 toward a front of the seat shell 102. In one embodiment, the first openings 128A can be formed adjacent to left and right side regions of the seatback 106 above the seating portion 104, whereas the second openings 128B can be formed adjacent to left and right side regions of the seating portion 104. On the inner side of the seat shell 102, each of the anchor strap portions 122 can be guided through the guide bracket 124, travel at an underside of the seating portion 104 toward a front of the seat shell 102, and then connect with a tension adjusting device 130.

Figure 3:
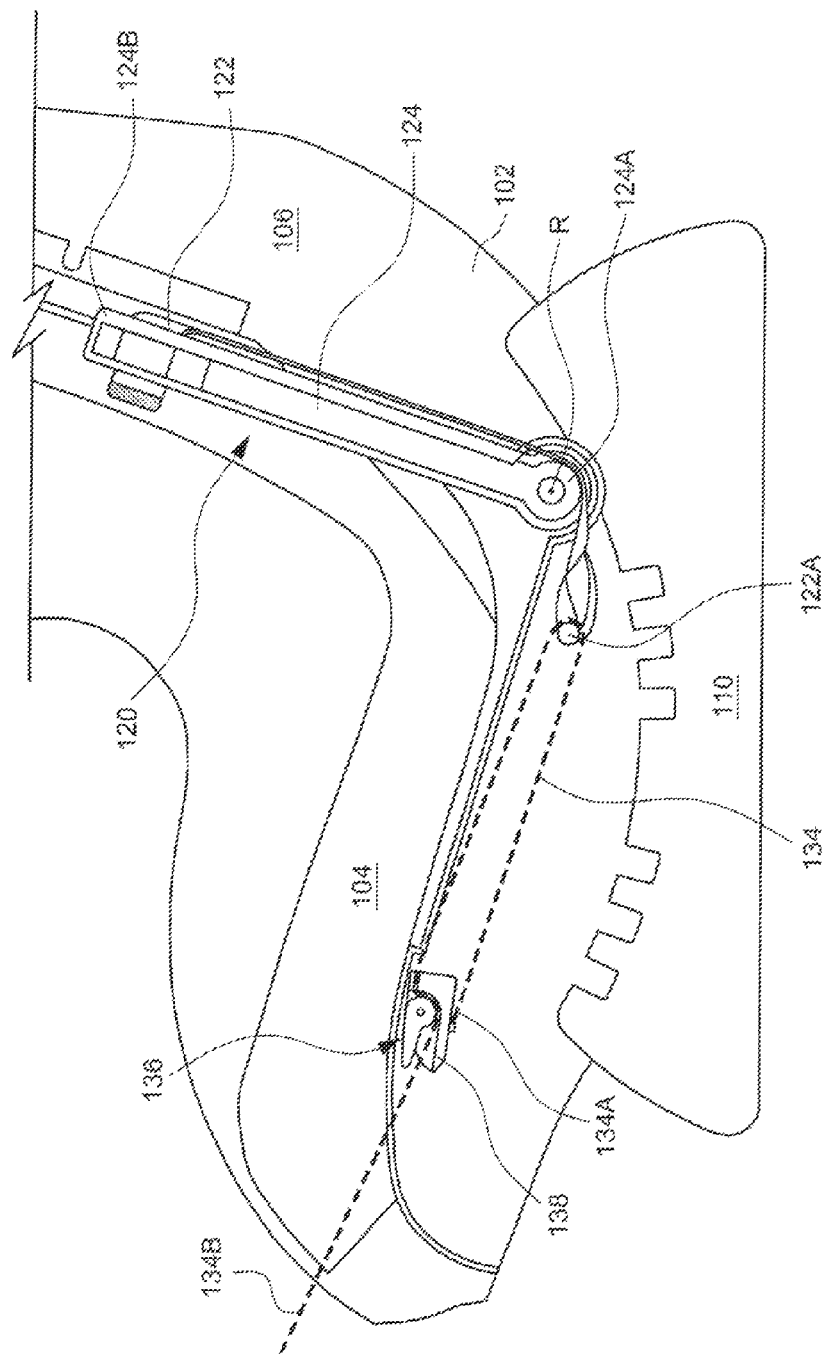
FIG. 3 is a cross-sectional view of the child safety seat shown in FIG. 1.

In conjunction with FIGS. 1 and 2, FIG. 3 is a schematic cross-sectional view illustrating an embodiment of the restraint system 120. As shown in FIGS. 1-3, the guide bracket 124 can be formed from a panel. However, alternate embodiments may also have the guide bracket 124 formed as a frame constructed from the assembly of tube segments. The guide bracket 124 can have a coupling end 124A, a distal end 124B, and two slits 124C spaced-apart from each other along a width direction of the guide bracket 124. The coupling end 124A can be pivotally connected with the seat shell 102, e.g., adjacent to a region where the seating portion 104 joins with the seatback 106. In one embodiment, the pivot axis R about which the guide bracket 124 rotates relative to the seat shell 102 can be approximately equidistant from a first transverse axis L1 joining the first openings 128A, and a second transverse axis L2 joining the second openings 128B and below the first transverse axis L1. The guide bracket 124 can be pivotally adjusted so that the distal end 124B is placed adjacent to either of the first transverse axis L1 and the second transverse axis L2.

Each of the anchor strap portions 122 can travel along a length of the guide bracket 124, and can be guided through the guide bracket 124 to turn in a transverse direction. The slits 124C can be located near the distal end 124B of the guide bracket 124. Each of the anchor strap portions 122 can be respectively guided through one associated slit 124C, extend along the guide bracket 124 toward the coupling end 124A, wrap around the pivot axis R, and then connect with the tension adjusting device 130. Accordingly, the anchor strap portions 122 can be held and moved with the guide bracket 124 when the guide bracket 124 rotates about the pivot axis R.

The tension adjusting device 130 can include an adjustment strap portion 134 and a spring-biased lock 136. The adjustment strap portion 134 can have a first side connected with the anchor strap portions 122 (as shown with dashed lines in FIG. 2), and an opposite second side cooperating with the lock 136. The adjustment strap portion 134 and the anchor strap portions 122 can be provided as two distinct straps that are attached with each other. For securely attaching the anchor strap portions 122 with the adjustment strap portion 134, the anchor strap portions 122 can have an anchor end 122A. The adjustment strap portion 134 can loop around and be sewed with the anchor end 122A, extend at an underside of the seating portion 106 toward a front of the seat shell 102, travel through an opening 140 from the underside to an upper side of the seating portion 106, and assemble with the lock 136 located near the front of the seat shell 102.

It is worth noting that the construction of the adjustment strap portion 134 and the two anchor strap portions 122 is not limited to the aforementioned example. In alternate embodiments, the adjustment strap portion 134 and the two anchor strap portions 122 can also be formed from a single strap. In this case, the same strap can be folded and looped through the guide bracket 124 to define the adjustment strap portion 134 and the two anchor strap portions 122.

Figure 4:
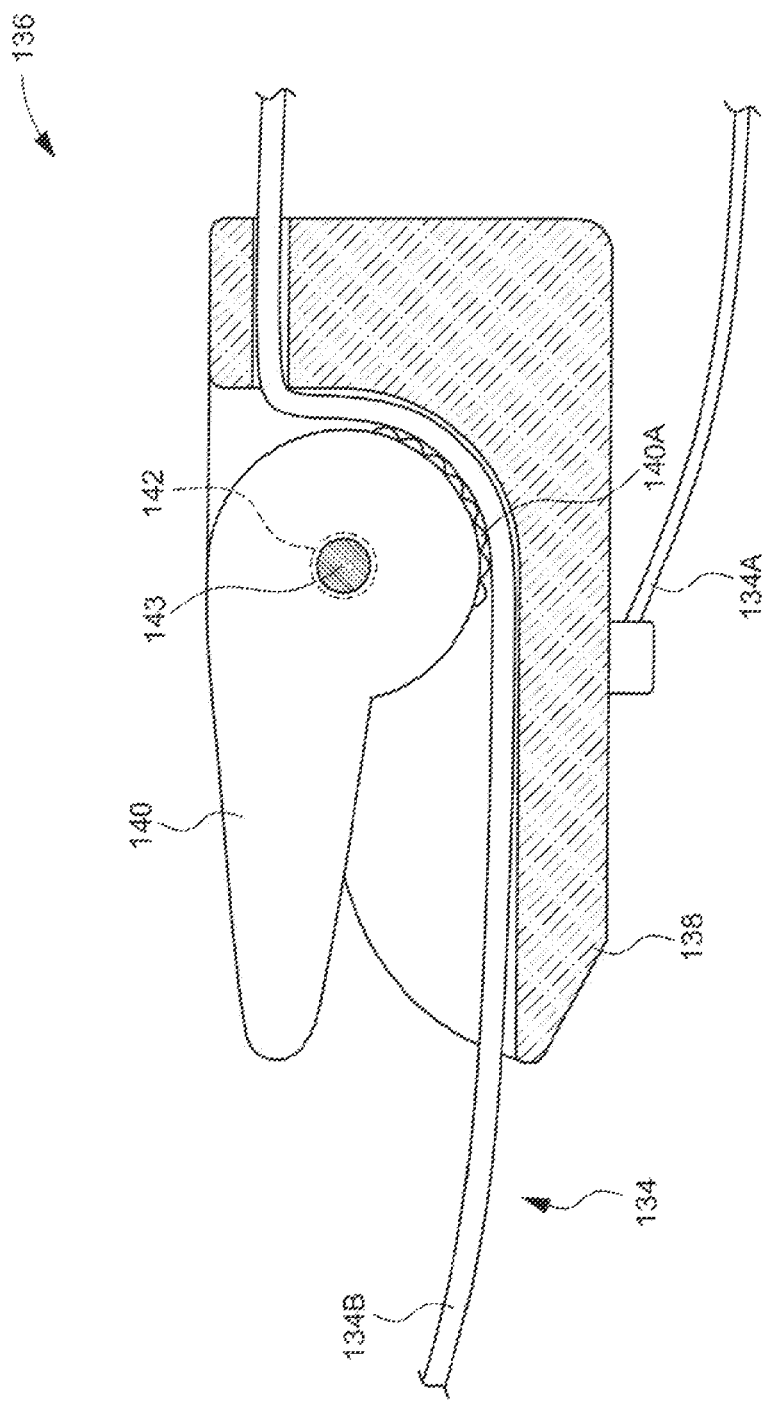
FIG. 4 is a schematic enlarged view illustrating a tension adjusting device of the restraint system.

FIG. 4 is a schematic enlarged view illustrating exemplary construction of the lock 136. The lock 136 can include a base plate 138, a latch arm 140 and a spring 142 (shown with dashed lines). The latch arm 140 can be pivotally connected with the base plate 138 about a pivot axle 143. The spring 142 can be a torsion spring mounted around the pivot axle 143 of the latch arm 140, and is configured to bias the latch arm 140 toward the base plate 138. In one embodiment, the lock 136 can be securely affixed with the seating portion 104 of the seat shell 102. In alternate embodiments, the lock 136 can be assembled with the adjustment strap portion 134 and be separate from the seat shell 102.

As shown in FIG. 3, the adjustment strap portion 134 can have an end portion 134A affixed with the base plate 138, extend toward the rear of the seat shell 102 and loop around the anchor end 122A, and then travel toward the front of the seat shell 102 and pass between the base plate 138 and the latch arm 140. The latch arm 140 can have a toothed portion 140A that is urged to press on a strap portion of the adjustment strap portion 134 by the biasing action from the spring 142. The adjustment strap portion 134 can be accordingly clamped and locked between the base plate 138 and the latch arm 140. The latch arm 140 can be rotated away from the base plate 138 such that the toothed portion 140A can unclamp the adjustment strap portion 134, after which an outward distal end portion 134B of the adjustment strap portion 134 can be pulled to cause the adjustment strap portion 134 to travel through the lock 136 for adjusting the tension in the anchor strap portions 122.

Figure 5:
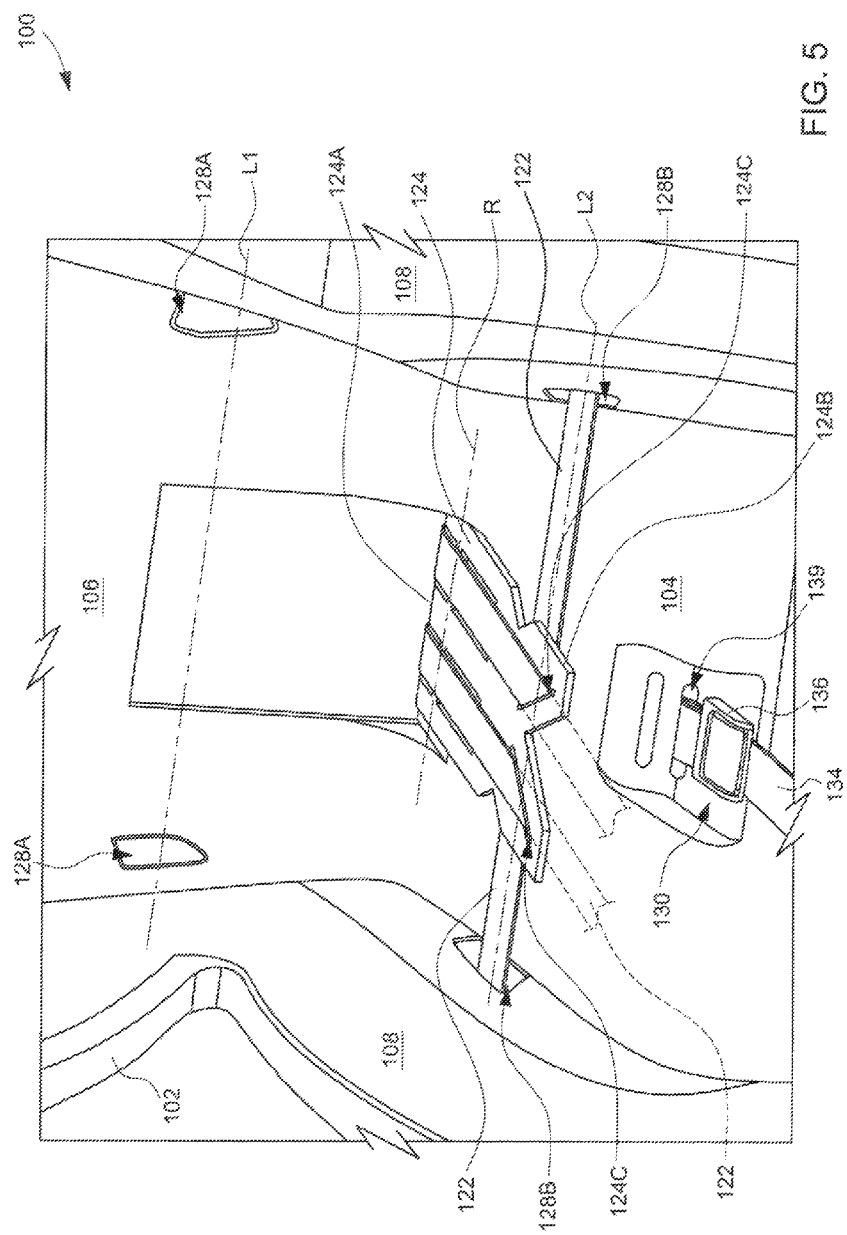
FIG. 5 is a schematic view illustrating exemplary adjustment of a guide bracket of the restraint system.

In conjunction with FIGS. 1-3, FIG. 5 is a schematic view illustrating exemplary adjustment of the guide bracket 124. The guide bracket 124 can be rotated about the pivot axis R for adjustment between two positions: a first position where the guide bracket 124 lies closely adjacent to the seatback 106 (as shown in FIGS. 1-3), and a second position where the guide bracket 124 lies closely adjacent to the seating portion 104 (as shown in FIG. 5). As the guide bracket 124 rotates relative to the seat shell 102, the anchor strap portions 122 can be held with the guide bracket 124 for convenient routing.

In the first position shown in FIGS. 1-3, the guide bracket 124 can lie adjacent to the side of the seatback 106 (i.e., adjacent to a front surface of the seatback 106) and extend approximately along its lengthwise axis. As a result, the distal end 124B of the guide bracket 124 can be placed near the first openings 128A, and the slits 124C can be substantially aligned with the transverse axis L1. In this configuration, the anchor strap portions 122 can be conveniently routed upward along the guide bracket 124 toward the height of the first openings 128A, and then travel in divergent directions to respectively extend through the first openings 128A onto the rear of the seat shell 102.

In the second position shown in FIG. 5, the guide bracket 124 can lie adjacent to the side of the seating portion 104 (i.e., adjacent to an upper surface of the seating portion 104) and extend approximately along a lengthwise axis of the seating portion 104. As a result, the distal end 124B of the guide bracket 124 can be placed near the second openings 128B, and the slits 124C can be substantially aligned with the transverse axis L2. Accordingly, the anchor strap portions 122 can be routed forward along the guide bracket 124, and then travel in divergent transverse directions to respectively extend through the second openings 128B, and then be routed toward the front of the seat shell 102.

In alternate embodiments, rather than passing through the second openings 128B, the anchor strap portions 122 can be stretched along the guide bracket 124, and then continuously extended forward on an upper surface of the seating portion 104 toward the front of the seat shell 102 for attachment to the anchor structure 144 of the vehicle (as shown with dashed lines in FIG. 5).

Figure 6:
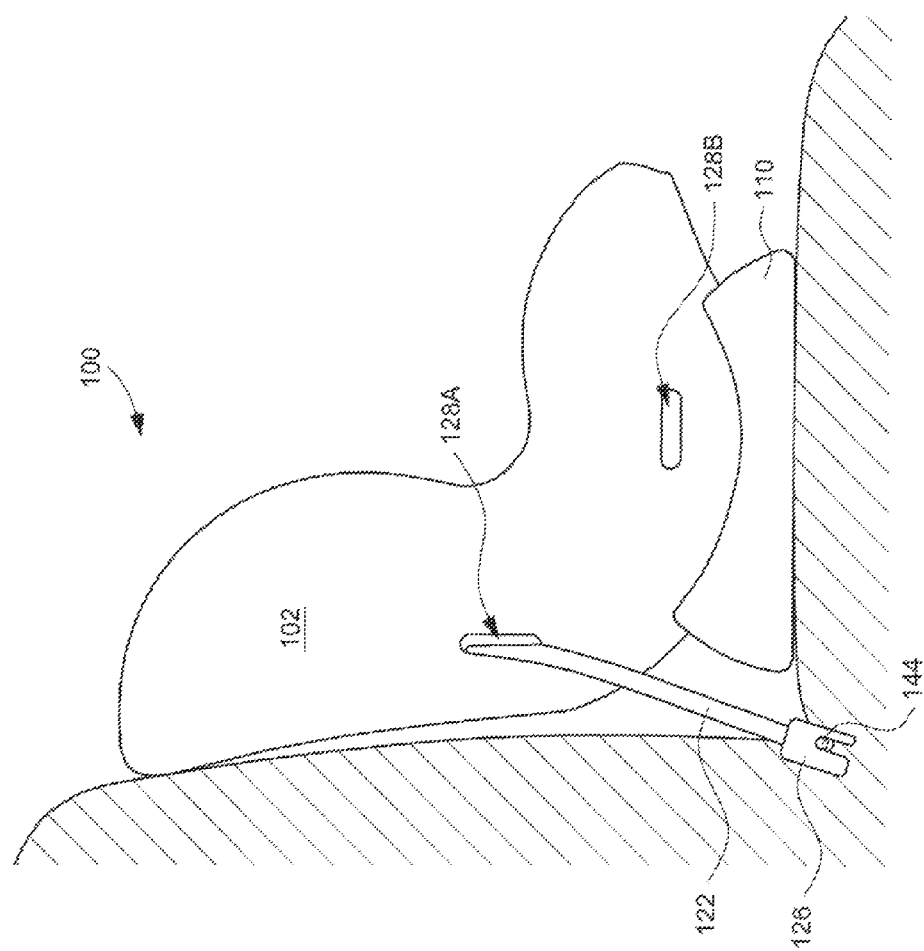
FIG. 6 is a schematic view illustrating the child safety seat installed in a vehicle in a forward facing configuration.

FIG. 6 is a schematic view illustrating the child safety seat 100 installed on a seat of a vehicle in a forward facing configuration (i.e., the front of the seat 100 is oriented to face the front of the vehicle opposite to the seatback of the vehicle seat). When the child safety seat 100 is used in this configuration, the guide bracket 124 can be adjusted to the position shown in FIGS. 1-3. Accordingly, the anchor strap portions 122 can extend through the first openings 128A onto the rear of the seat shell 102 to facilitate the attachment of the fasteners 126 with an anchor structure 144 (e.g., a transverse bar or loop) affixed with the vehicle seat.

Figure 7:
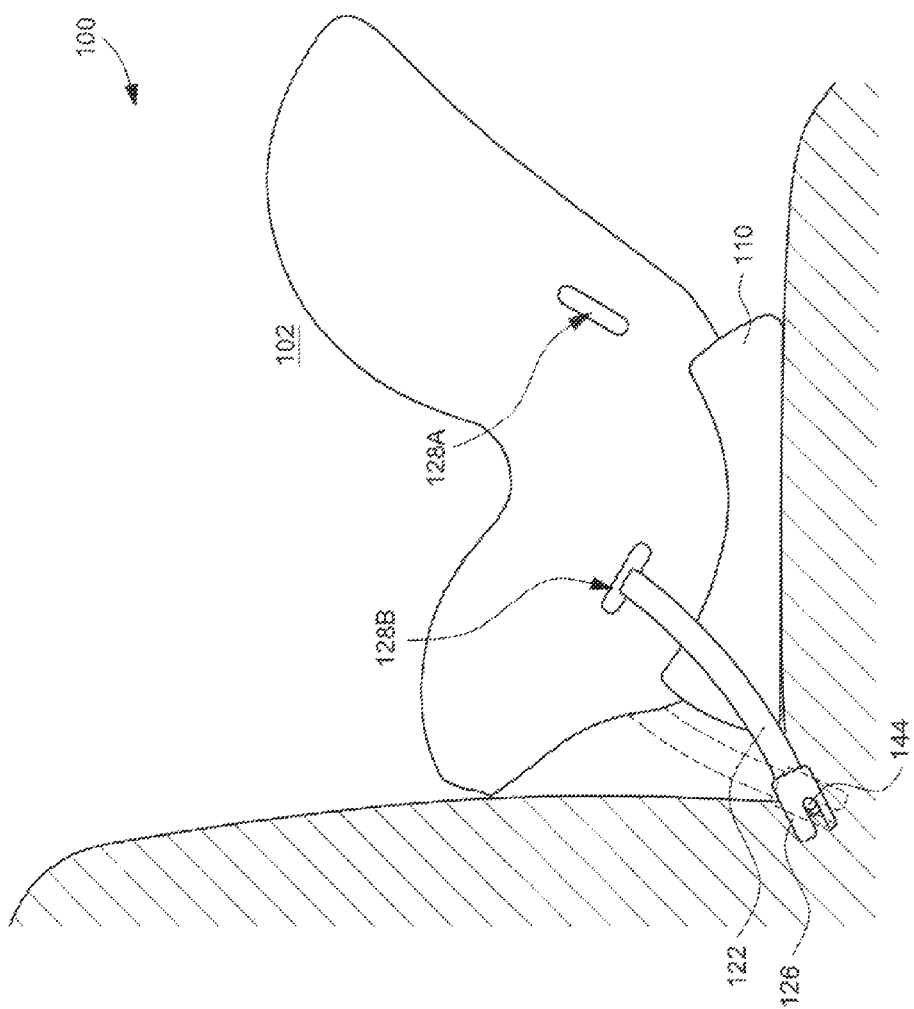
FIG. 7 is a schematic view illustrating the child safety seat installed in a vehicle in a rearward facing configuration.

FIG. 7 is a schematic view illustrating the child safety seat 100 installed on the vehicle seat in a rearward facing configuration (i.e., the front of the child safety seat 100 is oriented to face the rear of the vehicle and the seatback of the vehicle seat). When the child safety seat 100 is used in this configuration, the guide bracket 124 can be adjusted to the position shown in FIG. 5. Accordingly, the anchor strap portions 122 can extend through the second openings 128B toward the front of the seat shell 102 to facilitate the attachment of the fasteners 126 with the anchor structure 144.

Once the fasteners 126 lock with the anchor structure 144, the tension adjusting device 130 can be operable to properly tension the anchor strap portions 122. For example, the lock 136 can be unlocked, and the distal end portion 134B of the adjustment strap portion 134 can be pulled to tension the anchor strap portions 122. Once the anchor strap portions 122 are adequately tensioned, the lock 136 can clamp on the adjustment strap portion 134 to keep the anchor strap portions 122 in the tensioned state.

It is worth noting that in case the lock 136 is provided independently movable relative to the seat shell 102, the lock 136 can also be adjusted to lie adjacent to the opening 139 while the adjustment strap portion 134 is pulled to tension the anchor strap portions 122. Once the adjustment strap portion 134 is clamped by the lock 136, the lock 136 can abut against the seat shell 102 to restrain displacements of the adjustment strap portion 134 and keep the anchor strap portions 122 in the tensioned state.

While the aforementioned embodiments require manual adjustment of the tension in the anchor strap portions 122, variant embodiments can also provide spring-biased retractor mechanisms that can continuously keep the anchor strap portions 122 in a tensioned state. Embodiments with retractor mechanisms are described hereafter with reference to FIGS. 8-10.

Figure 8:
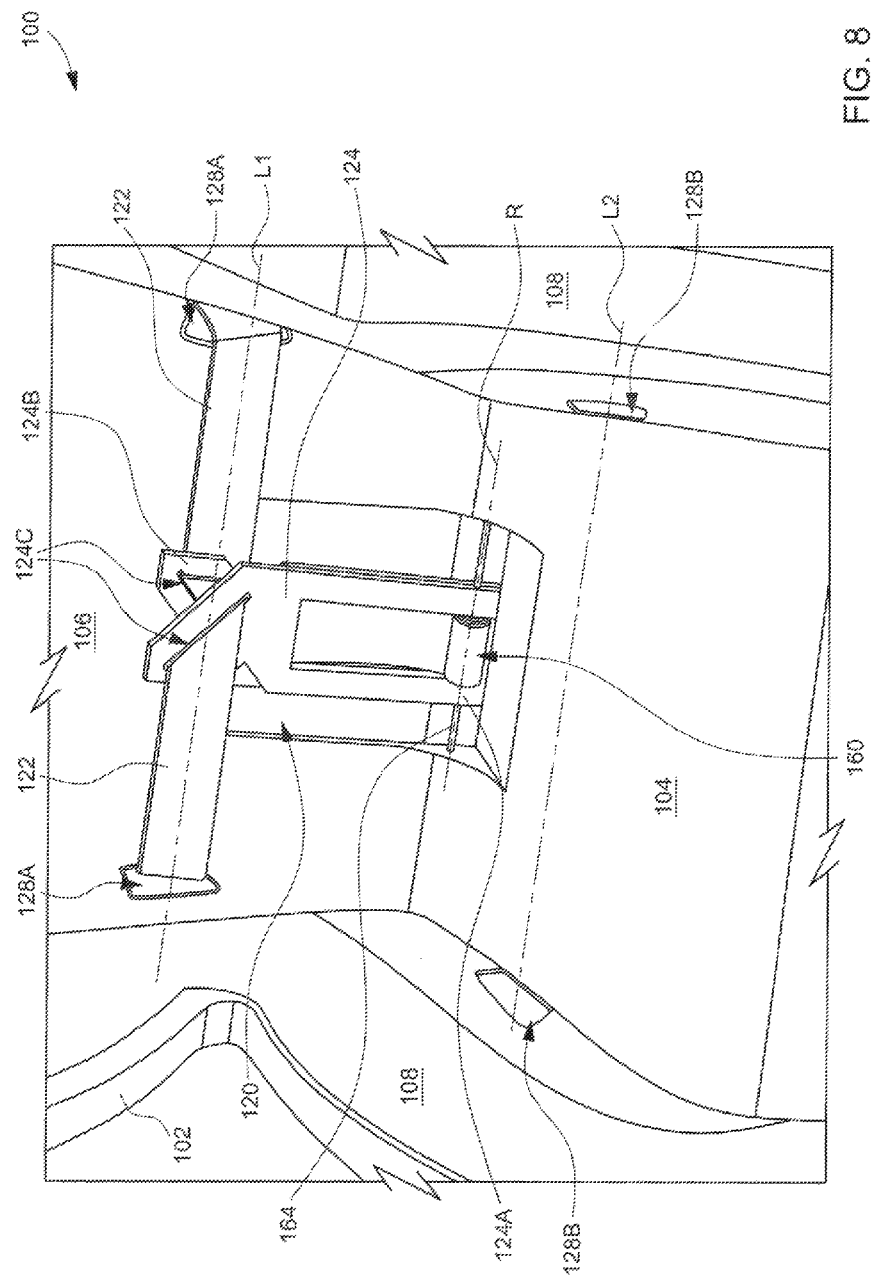
FIG. 8 is a schematic view illustrating an embodiment in which a spring-biased retractor is provided to keep anchor strap portions of the restraint system in a tensioned state.
Figure 9:
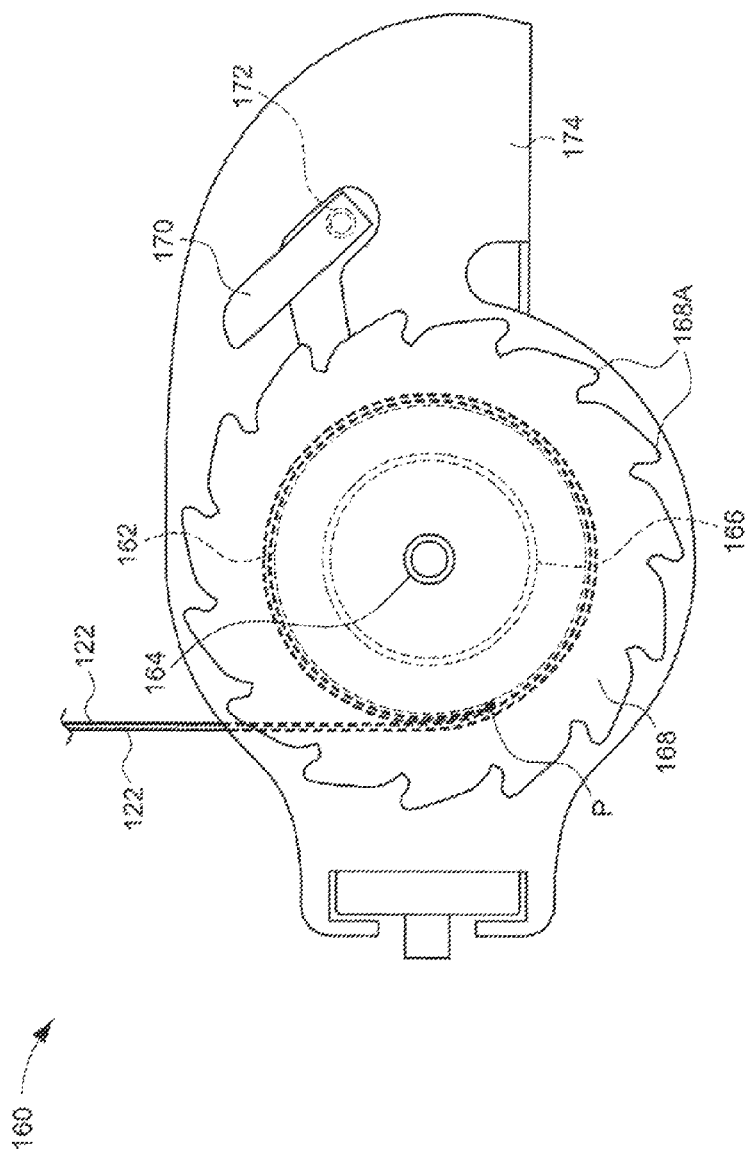
FIG. 9 is a schematic view illustrating a construction of the retractor shown in FIG. 8.

FIG. 8 is a schematic view illustrating an embodiment in which a spring-biased retractor 160 is provided to keep the anchor strap portions 122 in a tensioned state, and FIG. 9 is a schematic side view illustrating a construction of the retractor 160. Referring to FIGS. 8 and 9, the retractor 160 can be mounted adjacent to the coupling end 124A of the guide bracket 124. The retractor 160 can include a drum 162 pivotally connected around a shaft 164 affixed with the seat shell 102, a motor spring 166 (shown with dashed lines) connected between the drum 162 and a fixed portion of the seat shell 102, ratchet wheels 168 having a plurality of teeth 168A and respectively connected with two opposite sides of the drum 162, two pawls 170, and biasing springs 172 respectively coupled with the pawls 170 (only one side of the drum 162 with one ratchet wheel 168, one pawl 170 and one biasing spring 172 is represented in FIG. 9, the other side being similar in construction). In one embodiment, the axis about which the drum 162 rotates relative to the seat shell 102 can be substantially aligned with the pivot axis R of the guide bracket 124. The biasing springs 172 can be pivotally mounted with a frame 174 that is affixed with the seat shell 102.

A single anchor strap can be wrapped around the drum 162 such that it forms two strap portions that are routed parallel along the guide bracket 124, and then passed through the slits 124C to form the two anchor strap portions 122. A portion of the anchor strap can be affixed with a surface of the drum 162 (for example at the point P), which can rotate to either wind or unwind the anchor strap portions 122. More particularly, the motor spring 166 can bias the drum 162 to rotate in a direction that winds and takes up the anchor strap. Each of the pawls 170 can be urged by the associated biasing spring 172 to engage with any of the teeth 168A of the corresponding ratchet wheel 168 for blocking rotation of the drum 162 in a reverse direction that unwinds the anchor strap portions 122 (the pawl 170 shown in FIG. 9 is exemplary shown in a disengaged state).

During adjustment, the guide bracket 124 can be rotated to a position either on the side of the seatback 106 or on the side of the seating portion 104. The pawls 170 then can be actuated to respectively disengage from the ratchet wheels 168, after which the anchor strap portions 122 can be pulled to attach with the anchor structure provided in the vehicle. Once the fasteners 126 are attached, the motor spring 166 can act to properly tension the anchor strap portions 122. Moreover, the pawls 170 can be biased to block rotation of the drum 160 in the direction that unwinds the anchor strap portions 122, which can accordingly hold the seat shell 102 in place.

Figure 10:
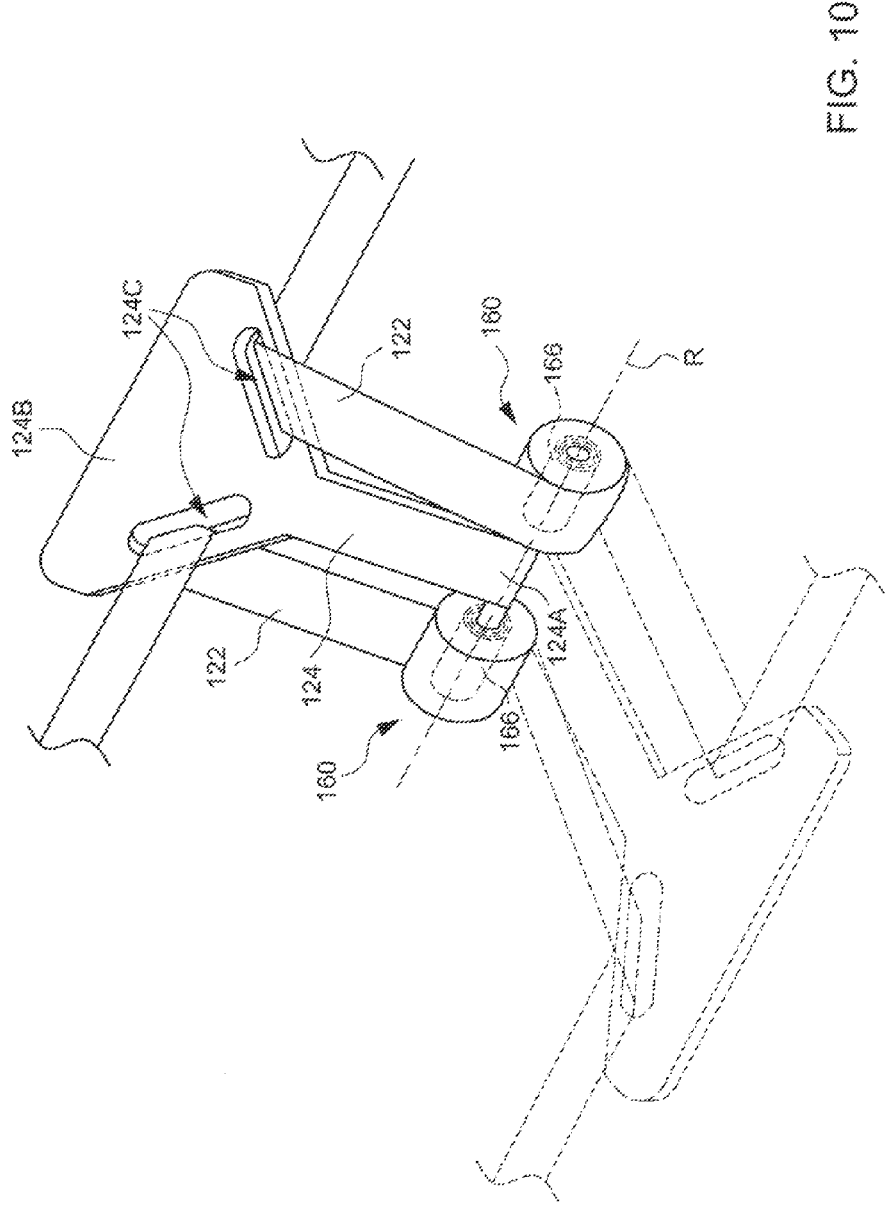
FIG. 10 is a schematic view illustrating another embodiment in which multiple spring-biased retractors are provided to keep anchor strap portions of the restraint system in a tensioned state.

While the embodiment shown in FIG. 8 uses a single strap to form the two anchor strap portions 122, alternate embodiments may use two distinct straps to respectively form the anchor strap portions 122. In this case, two of the retractors 160 described previously can be provided. FIG. 10 is a schematic view illustrating an embodiment in which two spring-biased retractors 160 are provided to tension the two anchor strap portions 122 formed by two distinct anchor straps. The retractors 160 can be substantially aligned with the pivot axis R of the guide bracket 124. Each of the anchor straps can be guided through one slit 124C of the guide bracket 124, and can have opposite first and second distal ends respectively connected with one retractor 160 and one fastener 126. Like previously described, the guide bracket 124 can be pivotally adjusted to lie on the side of the seatback 106 (as shown with solid lines in FIG. 10) or on the side of the seating portion 104 (as shown with dashed lines in FIG. 10). The retractors 160 can act to respectively tension the two anchor straps so that the seat shell 102 can be properly held in place.

At least one advantage of the structures described herein is the ability to provide a guide bracket that can conveniently adjust the position of the anchor strap portions according to the placement of the child safety seat in the vehicle, i.e., installed in a forward facing or rearward facing position. Accordingly, the installation of the child safety seat in the vehicle can be facilitated, and erroneous manipulation can be prevented.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. A child safety seat comprising:
a seat shell;
an anchor strap portion, the anchor strap portion having a distal end connected with a fastener that is operable to attach the seat shell with an anchor structure provided in a vehicle;
an adjustment strap portion connected with the anchor strap portion;
a guide bracket movably assembled with the seat shell, the guide bracket including a coupling end pivotally connected with the seat shell, wherein the anchor strap portion extends along the guide bracket, wraps around the coupling end, and connects with the adjustment strap portion, and the anchor strap portion is at least partially held with the guide bracket when the guide bracket is adjusted relative to the seat shell; and
a spring-biased lock disposed at a front of the seat shell and operable to engage with the adjustment strap portion, when the lock is in a locked state, movement of the adjustment strap portion through the lock is blocked, and when the lock is in an unlocked state, movement of the adjustment strap portion through the lock is allowed to adjust a tension in the anchor strap portion.

2. The child safety seat according to claim 1, wherein the seat shell has a seating portion and a seatback, and the guide bracket is adjustable between a first position extending on a side of the seatback, and a second position extending on a side of the seating portion.

3. The child safety seat according to claim 1, wherein the guide bracket is adjustable between a first position to facilitate routing of the anchor strap portion toward a rear of the seat shell, and a second position to facilitate routing of the anchor strap portion toward a front of the seat shell.

4. The child safety seat according to claim 1, wherein the seat shell includes a first opening through which the anchor strap portion extends outside the seat shell and toward a rear of the seat shell, and a second opening through which the anchor strap portion extends outside the seat shell and toward a front of the seat shell, the guide bracket being adjustable between a first position adjacent to the first opening, and a second position adjacent to the second opening.

5. The child safety seat according to claim 4, wherein the anchor strap portion passes through a slit formed through the guide bracket, the slit being substantially aligned with the first opening when the guide bracket is in the first position, and the slit being substantially aligned with the second opening when the guide bracket is in the second position.

6. The child safety seat according to claim 1, wherein the anchor strap portion travels along a length of the guide bracket, and is guided through the guide bracket to turn in a transverse direction which is perpendicular to the length of the guide bracket.

7. The child safety seat according to claim 1, wherein the guide bracket is pivotally connected with the seat shell.

8. The child safety seat according to claim 1, wherein the adjustment strap portion and the anchor strap portion are formed from a single strap.

9. The child safety seat according to claim 1, wherein the anchor strap portion is connected with a spring-biased retractor operable to keep the anchor strap portion in a tensioned state.

10. The child safety seat according to claim 1, further including a second anchor strap portion, wherein the second anchor strap portion has a second distal end connected with a second fastener operable to attach the seat shell with the anchor structure, the second anchor strap portion being at least partially held with the guide bracket when the guide bracket is adjusted relative to the seat shell.

11. The child safety seat according to claim 10, wherein the two anchor strap portions are formed from a single strap.

12. A child safety seat comprising:
a seat shell having a transverse direction extending along a width of the seat shell;
an anchor strap portion, the anchor strap portion having a distal end connected with a fastener that is operable to attach the seat shell with an anchor structure provided in a vehicle; and
a guide bracket adjustable relative to the seat shell between a first position and a second position, the guide bracket including a coupling end pivotally connected with the seat shell about a pivot axis, wherein the anchor strap portion is routed along the guide bracket in a radial direction relative to the pivot axis and is guided through the guide bracket at a location away from the coupling end to turn from the radial direction to the transverse direction;
wherein the anchor strap portion is routed along the guide bracket in the first position to place the distal end of the anchor strap portion at a rear of the seat shell, and the anchor strap portion is routed along the guide bracket in the second position to place the distal end at a front of the seat shell.

13. The child safety seat according to claim 12, wherein the seat shell has a seating portion and a seatback, the guide bracket extending on a side of the seatback in the first position, and extending on a side of the seating portion in the second position.

14. The child safety seat according to claim 12, wherein the anchor strap portion travels along a length of the guide bracket, and is guided through the guide bracket to turn to the transverse direction which is perpendicular to the length of the guide bracket.

15. The child safety seat according to claim 12, wherein the anchor strap portion passes through a slit formed through the guide bracket, the slit being substantially aligned with a first opening of the seat shell when the guide bracket is in the first position, and the slit being substantially aligned with the second opening when the guide bracket is in the second position, the anchor strap portion traveling in the transverse direction through the first opening to extend at an outside of the seat shell toward the rear of the seat shell, and the anchor strap portion traveling in the transverse direction through the second opening to extend at the outside of the seat shell toward the front of the seat shell.

16. The child safety seat according to claim 12, wherein the anchor strap portion is at least partially held with the guide bracket when the guide bracket is adjusted relative to the seat shell.

17. The child safety seat according to claim 12, further comprising:
an adjustment strap portion connected with the anchor strap portion; and a spring-biased lock disposed at a front of the seat shell and through which is arranged the adjustment strap portion, the lock being operable to releasibly engage with the adjustment strap portion.

18. The child safety seat according to claim 17, wherein the anchor strap portion extends along the guide bracket, wraps around the coupling end, and connects with the adjustment strap portion.

19. The child safety seat according to claim 12, wherein the anchor strap portion is connected with a spring-biased retractor operable to keep the anchor strap portion in a tensioned state.

* * * * *